United States Patent Office 3,429,233
Patented Feb. 25, 1969

3,429,233
RESISTANCE STROKE CONTROL CYLINDER
Lee A. Wright, Kellering, Ohio, assignor to Compressed Air Service Company, Moraine, Ohio, a corporation of Ohio
Filed Oct. 6, 1966, Ser. No. 584,754
U.S. Cl. 92—24      10 Claims
Int. Cl. F15b *15/26*

ABSTRACT OF THE DISCLOSURE

The cylinder includes ports at its respective opposite ends for alternately admitting and discharging fluid thereby to reciprocate a power piston contained within the cylinder, this piston being fixed to a piston rod. The piston rod carries a radially expandible locking ring which is actuated by a fluid operated, actuating piston carried by the piston rod for axial movement relative thereto. Fluid under pressure admitted to one face of the power piston also acts on the actuating piston to urge the locking ring into locking engagement with the bore of the cylinder. After this lock has been achieved, the power piston may move only a limited amount before it is positively stopped. The lock is released when fluid is admitted to the other end of the cylinder.

---

The present invention relates to a resistance stroke control cylinder or safety cylinder of the fluid operated type, and more particularly the present invention relates to new and improved locking means for such a cylinder.

Cylinders of the type mentioned above are provided with locking means for locking the cylinder and piston rod thereof together under certain conditions, unlocking of the piston rod from the cylinder usually being accomplished by reversing the direction of fluid flow. The present invention has to do with unique locking means for these cylinders, wherein such locking means is operated by an actuating piston, which piston is actuated by the same fluid medium used to operate the cylinder itself.

In accordance with the present invention, the locking means operates in such manner that the associated resistance stroke control cylinder applies full clamping pressure against a workpiece or other unyielding object against which it is applied. On the other hand, if a yielding resisting force is encountered by the cylinder, as is the case when a hand or finger is engaged by the cylinder, the locking means is actuated and thereafter only very limited overtravel or further movement of the piston rod is permitted, thereby preventing injury or damage to a yieldable object, as the case may be.

A primary object of the present invention is the provision of a new and improved resistance stroke control cylinder or safety cylinder including unique fluid pressure operated locking means.

Another object of the present invention is to provide new and improved locking means in a cylinder of the type described, such locking means being actuated by an increase in pressure in the cylinder as a result of the piston rod encountering a resistance force of a predetermined magnitude.

Still another object of the present invention is the provision of locking means of the type described, said locking means being associated with actuating means including a fluid operated piston carried by the piston rod for movement relative thereto, such movement of the actuating piston in response to fluid pressure serving to actuate camming means for expanding the locking means into frictional engagement with the bore of the cylinder.

Even another object of the present invention is the provision of locking means of the type described, such locking means being associated with other means for permitting only limited overtravel or further movement of the piston rod after the locking means have been actuated, thereby preventing injury to a yieldable resisting member, such as a human hand.

These and other objects and advantages of the invention will become apparent from the following specification disclosing a preferred embodiment illustrated in the accompanying drawings wherein.

Figure 1:
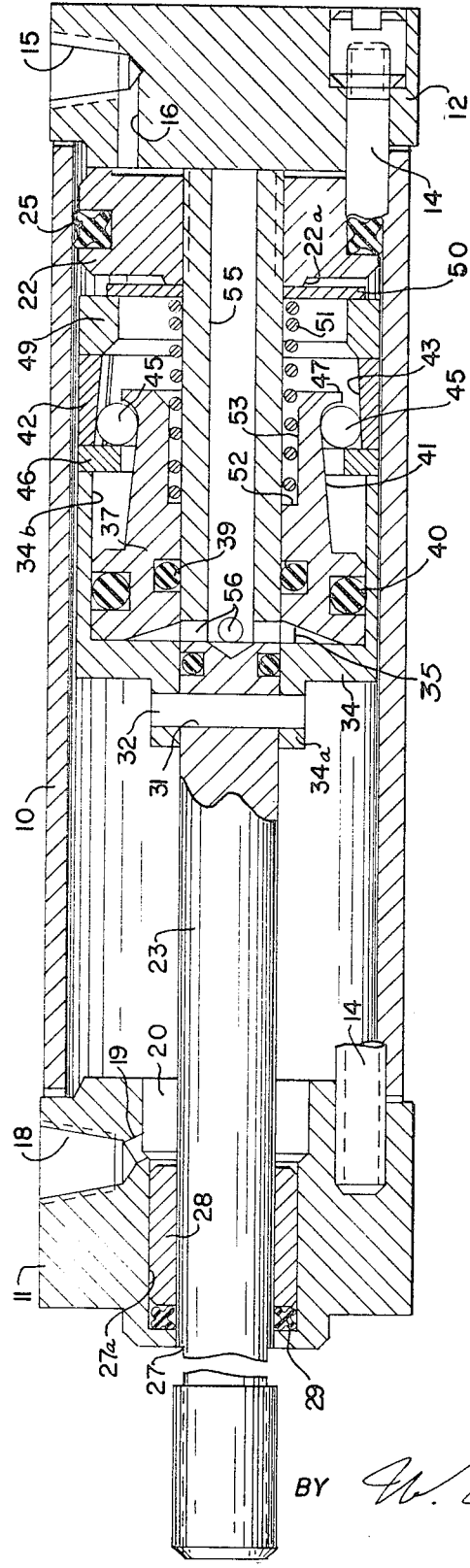
FIG. 1 is a longitudinal central section taken through a fluid motor embodying the present invention.

Referring to FIG. 1, the fluid motor shown will be seen to include a cylinder 10 closed at respective opposite ends thereof by caps 11 and 12, which caps are held in sealing relation with opposite ends of the cylinder 10 by a plurality of longitudinally extending fasteners, one fastener being fragmentarily shown and designated 14. Cap 12 includes a passageway 15 communicating at the other end thereof with a port 16 opening at the inner face of the cap 12. Similarly, cap 11 includes a passageway 18 communicating at the other end thereof with a port 19, such port in turn communicating with an annular space 20 formed in the cap 11.

A piston 22 is mounted on one end of a piston rod 23, as by a threaded connection for example. The piston includes an annular groove receiving a sealing ring 25 thereby forming a seal between the cylinder 10 and piston 22. The end portion of the piston rod 23 remote from the end thereof supporting the piston 22 extends exteriorly of the cylinder 10 through a central opening 27 in the end cap 11, which opening has an enlarged portion 27a receiving a bearing sleeve 28 slidable supporting the piston rod 23 for reciprocal movement. The enlarged portion 27a of the opening also receives a sealing ring 29 forming a seal between the piston rod 23 and the central opening in the end cap 11.

The piston rod 23 is provided intermediate its ends with a cross bore 31 receiving a pin 32 having opposite ends thereof received in diametrically opposed bores formed in the hub portion 34a of a cup member 34 including a cylindrical wall 34b. It will be noted that the wall 34b defines an annular space 35 with the piston rod 23, such annular space being closed at one end thereof and open at the other end thereof. An actuating piston 37 is mounted in the space 35 for axial reciprocal movement relative to the piston rod 23. The actuating piston is slidably sealed to the piston rod 23 and the annular wall 34b by O-rings 39 and 40, respectively.

It will be noted that the actuating piston 37 includes an integral extension defining a frusto-conical camming surface 41. A split-ring member 42 is mounted in encircling relation with the piston rod 23, which ring is adapted upon being expanded to grip the bore of the cylinder 10 for locking engagement therewith. The split ring 42 includes an inner frusto-conical shaped surface 43 which is complementary with the frusto-conical surface 41, such frusto-conical surfaces having therebetween a plurality of camming balls 45. Suitable retaining means including an annular member 46 cooperate with an outwardly extending flange 47 integral with the actuating piston for retaining the camming balls 45 between the frusto-conical surfaces.

A spacer ring 49 is disposed adjacent one end of the split ring 42. This spacer is engaged by a spring washer 50 mounted on the piston rod 23 between the spacer 49 and a hub portion 22a of the piston 22. A coil spring 51 is mounted on the piston rod 23, one end of this spring being in engagement with the spacer washer 50 and the other end thereof abutting a shoulder 52 formed by an enlarged bore portion 53, which bore portion also serves to receive the spring 51.

The piston rod 23 is provided with a blind bore 55 opening at the end of the piston rod supporting the piston 22. The piston rod is also provided with one or more radially extending ports 56 which place the port 55 in communication with the annular space 35.

The operation of the fluid motor embodying the present invention is as follows:

Assume there is little or no resistance to movement of the piston rod 23 and assume further that fluid under pressure is admitted to passageway 15 and port 16. The fluid acts on the face of piston 22 and carries the same and the piston rod 23 to the left as seen in FIG. 1. This fluid under pressure is admitted to the annular space 35 behind the actuating piston 37 tending to urge the latter to the right relative to the piston rod. However, the force of spring 51, plus the resisting frictional forces of the O-rings 39, 40 prevent such relative movement of the actuating piston 37 with respect to the piston rod 23. In other words, the piston 22, the piston rod 23 and the various parts carried thereby move to the left relative to the cylinder 10 in the relationship illustrated in FIG. 1.

Assume that the piston rod 23 encounters a firm and unyielding object, such as a workpiece. This of course will prevent further relative movement between the cylinder 10 and the piston rod 23. As the fluid under pressure is continued to be admitted through the passageway 15 and port 16, pressure increases in the cylinder 10 in the portion or chamber thereof defined by the piston 22 and the end cap 12. The pressure is correspondingly increased in the annular space 35 behind the actuating piston 37. In this respect, it will be noted that the diameter of bore 55 is greater than the diameter of port 16 thereby assuring that the pressure in the annular space 35 behind the actuating piston 37 will be nearly as great as the pressure in the aforementioned chamber defined by the piston 22 and end cap 12. When fluid pressure reaches a value for developing a force on the actuating piston 37 greater than the resisting force of the spring 51 and the other frictional forces, the actuating piston 37 will move to the right relative to the piston rod 23. This relative movement of the actuating piston causes the locking ring 42 to expand into tight frictional engagement with the bore in cylinder 10 by reason of the camming surfaces 41, 43 and the camming balls 45. Such expansion of the locking ring 42 serves to lock the same to the cylinder 10. The clamping force being exerted by the piston rod 23 will be equal to the force acting on the piston 22 and the adjacent end of the piston rod 23, plus the force acting on the base of the space 35 which is defined by the inner annular wall in the cup member 34, minus the resistance of spring 51, and minus resisting frictional forces. The various parts will now be in the relationship illustrated in FIG. 2.

Figure 3:
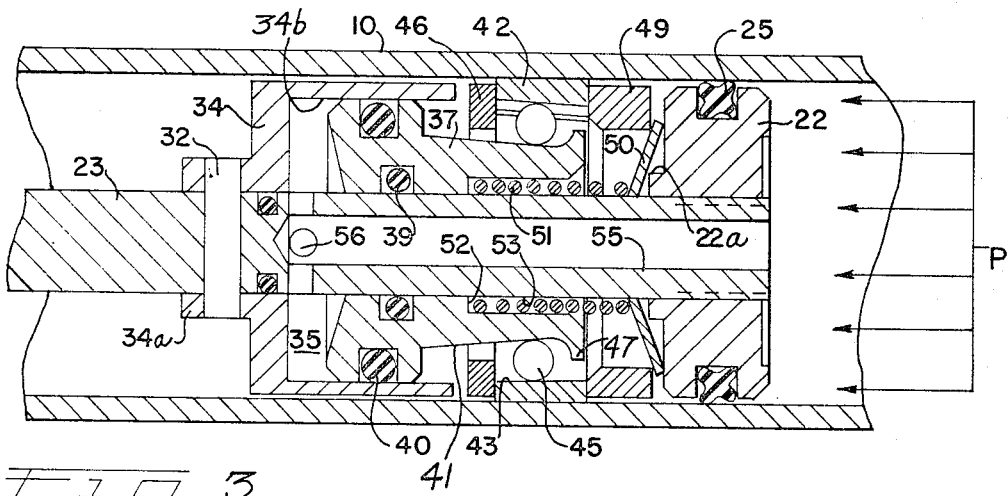
FIG. 3 is a fragmentary section similar to FIG. 1 showing the relationship of the various parts when the piston rod encounters a soft or yieldable object.

Assume now that the piston rod 23 encounters a yieldable resisting force, which would be the case if an operator's hand, for example, were to be engaged by the member being advanced by the piston rod. The resisting force acting on the piston rod 23 will again cause expension of the locking ring 42 as explained above, for bringing the same into firm gripping engagement with the cylinder 10. Since the resisting force is yieldable in nature, the piston 22 and piston rod 23 continue to move to the left. Because the ring 42 and the adjacent spacer ring 49 are locked to the cylinder 10, this additional travel of the piston 22 and piston rod 23 results in deflecting of the spring washer 50 to the position illustrated in FIG. 3. The overtravel of piston rod 23 is limited or positively stopped when the peripheral portion of the spring washer 50 is clamped between the spacer ring 49 and the piston 22 as shown in FIG. 3. The piston 23 is thereby locked against further movement, and accordingly the yieldable resisting object, such as the operator's hand, can be removed without being seriously injured. During this overtravel of the piston 23, fluid pressure is maintained in the actuating piston 37 to hold the locking ring 42 into firm frictional engagement with the bore in cylinder 10.

Figure 2:
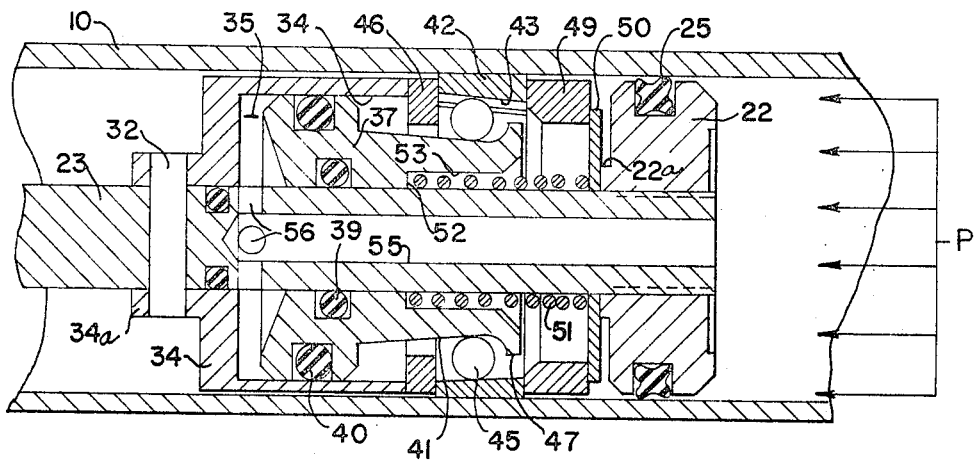
FIG. 2 is a fragmentary section similar to FIG. 1 illustrating the relationship of the various parts when the piston rod encounters a firm or unyielding resisting force.

The piston rod 23 will remain locked with respect to the cylinder 10 in the FIG. 2 and FIG. 3 positions, until the pressure in the cylinder chamber defined by the piston 22 and the cap 12 is lowered to a value such that the spring 51 is effective to move the actuating piston 37 to the left relative to the piston rod 23 thereby allowing contraction of the ring 42. Normally, the piston rod 23 and cylinder 10 are unlocked and returned to the FIG. 1 position by admitting fluid under pressure through the passageway 18, port 19 into the cylinder chamber defined by the piston 22 and the end cap 11 and by allowing fluid to exit through the passageway 15 from the cylinder chamber defined by the piston 22 and the end cap 12.

I claim:

1. In a fluid pressure operated piston and cylinder assembly including a closed cylinder and a piston and rod assembly therein with the piston defining first and second chambers within the cylinder bore and with the rod extending exteriorly of the cylinder through one end thereof, the improvement comprising, radially operable locking means carried by said piston and rod assembly within said cylinder and adapted, upon being actuated, to form a locking grip with the bore of said cylinder thereby releasably to lock said cylinder and piston and rod assembly together, actuating means for said locking means including another piston carried by said piston rod for movement relative thereto and in adjacent relation with said locking means, movement of said another piston in one direction relative to the piston rod in response to predetermined fluid pressure on one face thereof serving to expand said locking means into locking engagement with the cylindrical bore, biasing means urging said another piston in the other direction relative to the piston rod, said piston and rod assembly including port means communicating said one piston face of said another piston with only one of said chambers, whereby said locking means is actuated when fluid pressure in said one chamber reaches a predetermined value as a result of said piston rod encountering a resisting force of predetermined magnitude.

2. The improvement according to claim 1 further defined by, yieldable means connecting said locking means with said piston and rod assembly for permitting a limited amount of overtravel of the latter after actuation of the former, said port means serving to maintain the locking means in gripping engagement with the cylinder bore during such overtravel.

3. The construction according to claim 1 further defined by, said locking means including generally annular means, said another piston and said annular means having complementary cam surfaces, camming means interposed between said surfaces for expanding the annular means upon movement of said another piston in said one direction.

4. In a fluid motor of the type including a cylinder having a bore and end closures sealed thereto and defining ports, a piston and rod assembly including a piston rod sealed through one of the end closures and a power piston fixed to the piston rod and sealed with the cylinder bore thereby defining first and second chambers therein, the improvement comprising, actuating means including an actuating piston slidably mounted on the rod within the bore, expandible locking means carried by the rod for expansion into firm frictional engagement with the bore in response to movement of said actuating piston in one direction relative to the piston rod thereby releasably to lock said cylinder and piston and rod assembly together, resilient means urging the actuating piston in the other direction relative to the rod, said piston and rod assembly including port means communicating said actuating piston with only one of said chambers for moving said actuating piston in said one direction in response to fluid pressure in said one of said chambers exceeding a predetermined value, the pressure in said one chamber exceeding said value as a result of said piston rod encountering a resisting force of predetermined magnitude.

5. The improvement according to claim 4 further defined by, yieldable means connecting said locking means with said piston and rod assembly for permitting a limited amount of overtravel of the latter after actuation of the former, said port means serving to maintain the locking means in frictional engagement with the cylinder bore during such overtravel.

6. The improvement according to claim 4 further defined by, said locking means including generally annular means, said actuating piston and said annular means having complementary cam surfaces, camming means interposed between said surfaces for expanding the annular means upon movement of said actuating piston in said one direction.

7. In a fluid pressure operated piston and cylinder assembly including a closed cylinder and a piston and rod assembly therein with the piston defining first and second chambers within the cylinder bore and with the rod extending exteriorly of the cylinder through one end thereof, the improvement comprising, said piston rod having means including an annular wall defining an annular space extending axially of the rod in concentric relation therewith, one end of said space being closed and the other end being open, which other end is nearer said piston than said one end, another piston on said rod slidably sealed within said annular space to both the rod and said annular wall, spring means urging said pistons apart, radially operable locking means mounted between said pistons and adapted, upon being actuated, to form a locking grip with the bore of said cylinder thereby releasably to lock said cylinder and piston and rod assembly together, actuating means adapted to actuate said locking means in response to movement of said another piston toward the first mentioned piston, said piston rod including port means communicating one of said chambers with said annular space adjacent said one end thereof, whereby said locking means is actuated by an increase in fluid pressure in said one chamber above a predetermined value as a result of said piston rod encountering a resisting force of predetermined magnitude.

8. The improvement according to claim 7 further defined by, yieldable means connecting said locking means with said piston and rod assembly for permitting a limited amount of overtravel of the latter after actuation of the former, said port means serving to maintain the locking means in gripping engagement with the cylinder bore during such overtravel.

9. The improvement according to claim 7 further defined by, said locking means including a split ring having a frusto-conical inner surface, said another piston having an extension on the face thereof adjacent the first mentioned piston, which extension includes a frusto-conical surface complementary with the first mentioned frusto-conical surface, a plurality of camming balls arranged between said frusto-conical surfaces for expanding said ring upon movement of said another piston toward said first mentioned piston.

10. The improvement according to claim 9 further defined by, an annular spring washer mounted on the piston rod between said ring and the first mentioned piston, deflection of said spring washer serving to permit a limited amount of overtravel of said piston rod after actuation of said locking means.

References Cited

UNITED STATES PATENTS

| 435,139 | 8/1890 | Frolich | 92—28 X |
| 3,161,400 | 12/1964 | Floyd | 92—24 X |
| 3,272,087 | 9/1966 | Culver | 92—24 |
| 1,578,997 | 3/1926 | Hulshizer | 92—28 |
| 2,259,815 | 10/1941 | Greve | 92—28 X |
| 2,515,712 | 7/1950 | Horton et al. | 92—28 X |
| 2,845,902 | 8/1958 | Anderson | 92—28 X |
| 2,988,058 | 6/1961 | Warnecke | 92—28 |
| 3,320,862 | 5/1967 | Wright | 92—25 |
| 3,353,455 | 11/1967 | Berry | 92—27 X |

FOREIGN PATENTS 898,260  6/1962  Great Britain.

MARTIN P. SCHWADRON, *Primary Examiner.*

IRWIN C. COHEN, *Assistant Examiner.*

U.S. Cl. X.R.

92—27